(12) United States Patent
Kataoka et al.

(10) Patent No.: US 12,421,413 B2
(45) Date of Patent: Sep. 23, 2025

(54) AQUEOUS COATING COMPOSITION

(71) Applicant: KANSAI PAINT CO., LTD., Hyogo (JP)

(72) Inventors: Yasuyuki Kataoka, Kanagawa (JP); Tatsuya Kai, Kanagawa (JP); Yukako Kanda, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 369 days.

(21) Appl. No.: 17/921,294

(22) PCT Filed: Jun. 7, 2021

(86) PCT No.: PCT/JP2021/021646
§ 371 (c)(1),
(2) Date: Oct. 25, 2022

(87) PCT Pub. No.: WO2021/251352
PCT Pub. Date: Dec. 16, 2021

(65) Prior Publication Data
US 2023/0167327 A1    Jun. 1, 2023

(30) Foreign Application Priority Data

Jun. 8, 2020   (JP) ................................ 2020-099469

(51) Int. Cl.
| | | |
|---|---|---|
| *C09D 123/12* | (2006.01) | |
| *B65D 65/42* | (2006.01) | |
| *C09D 5/08* | (2006.01) | |
| *C09D 7/20* | (2018.01) | |
| *C09D 7/63* | (2018.01) | |
| *C09D 123/08* | (2006.01) | |

(52) U.S. Cl.
CPC .......... *C09D 123/12* (2013.01); *B65D 65/42* (2013.01); *C09D 5/08* (2013.01); *C09D 7/20* (2018.01); *C09D 7/63* (2018.01); *C09D 123/0869* (2013.01)

(58) Field of Classification Search
None
See application file for complete search history.

(56) References Cited

U.S. PATENT DOCUMENTS

| | | |
|---|---|---|
| 2005/0124753 A1 | 6/2005 | Ashihara et al. |
| 2009/0018251 A1 | 1/2009 | Ashihara et al. |
| 2012/0258249 A1 | 10/2012 | Adamson et al. |
| 2013/0143039 A1 | 6/2013 | Wilbur et al. |
| 2018/0361721 A1 | 12/2018 | Hirokami |
| 2019/0329291 A1 | 10/2019 | Tsubone et al. |
| 2022/0056301 A1 | 2/2022 | Yamazaki et al. |

FOREIGN PATENT DOCUMENTS

| | | |
|---|---|---|
| CN | 1649954 A | 8/2005 |
| JP | 51-074029 A | 6/1976 |
| JP | 2005-120306 A | 5/2005 |
| JP | 2005-179491 A | 7/2005 |
| JP | 2007-70614 A | 3/2007 |
| JP | 2011-42725 A | 3/2011 |
| JP | 2012-201762 A | 10/2012 |
| JP | 2015-229710 A | 12/2015 |
| JP | 2016-501291 A | 1/2016 |
| JP | 2016-113561 A | 6/2016 |
| JP | 2017-121772 A | 7/2017 |
| JP | 2018-197303 A | 12/2018 |
| JP | 2020-41063 A | 3/2020 |
| JP | 2020-100772 A | 7/2020 |
| WO | 2014/081838 A1 | 5/2014 |
| WO | 2020/145171 A1 | 7/2020 |

OTHER PUBLICATIONS

Search Report (PCT/ISA/210) issued Aug. 17, 2021 by the International Searching Authority for International Patent Application No. PCT/JP2021/021646.
Written Opinion (PCT/ISA/237) issued Aug. 17, 2021 by the International Searching Authority for International Patent Application No. PCT/JP2021/021646.
Office Action dated Jul. 7, 2023, issued by the China National Intellectual Property Administration in counterpart Chinese Patent Application No. 202180040736.X.
Office Action issued Jan. 6, 2024 by the China National Intellectual Property Administration, PRC in Chinese Patent Application No. 202180040736.X.
Communication dated Aug. 21, 2024, issued by the Korean Patent Office in counterpart Korean Application No. 10-2022-7035652.
Office Action dated May 13, 2025 issued by the Japan Patent Office in Japanese Patent Application No. 2022-530560.

*Primary Examiner* — Yan Lan

(74) *Attorney, Agent, or Firm* — Sughrue Mion, PLLC

(57) ABSTRACT

An aqueous coating composition including: an aqueous dispersion (A) of a polyolefin resin that includes a polypropylene (A1); a crosslinking agent (B) that has a carboxyl group-reactive functional group; an aminosilane (C); and an organic solvent (D) with a water solubility of 0.01-5.0 g/100 g and a boiling point of 120-250° C.

8 Claims, No Drawings

AQUEOUS COATING COMPOSITION

CROSS-REFERENCE TO RELATED APPLICATIONS

This application is a National Phase Entry of PCT International Application No. PCT/JP2021/021646, filed on Jun. 7, 2021, which claims priority to Japanese Patent Application No. 2020-099469, filed on Jun. 8, 2020, the contents of all of which are incorporated herein by reference in their entirety.

TECHNICAL FIELD

The present invention relates to an aqueous coating composition that is excellent in corrosion resistance, processability, and coating workability, and that is particularly suitable to be used for a can.

BACKGROUND ART

Various coating compositions such as an epoxy coating composition, a polyvinyl chloride coating composition, and a polyester coating composition have been used as coatings for a can from the viewpoints of coating film performance such as corrosion resistance and coating workability.

In particular, a coating composition containing, as a base resin, an epoxy resin that is produced using a raw material containing bisphenol A etc. has been widely and typically used.

However, from the viewpoint of an impact on the environment, a can coating composition, that is free from the raw material containing the bisphenol A (BPA) (also including a raw material that may contain a residual level of the BPA) is desired. For example, coating compositions etc. using vinyl or acrylic resins as base resins have been disclosed in PTL 1, PTL 2 and PTL 3.

In recent years, further, legal regulations are being enacted particularly in Europe and the United States to extend the scope of regulated substances to include not only the BPA, etc. but also styrene, formaldehyde, isocyanate, etc. At the same time, the regulations are being tightened.

As the number of the regulated substances increases in this manner, the degree of freedom for selecting a raw material that can be used for a coating composition is limited. In such a present situation, particularly a polyolefin resin is one of promising resins as a base resin of a coating composition used for an inner surface of a can.

Further, for example, an aqueous coating using an acrylic modified epoxy resin as a base resin has been developed from the viewpoint of reducing the use of an organic solvent also in coating for a can.

In PTL 4, a coating composition in which an aqueous dispersion solution containing polyolefin and a stabilizing solvent composition etc. containing an alcohol are used as constituent components has been disclosed as a can coating composition using a polyolefin resin as a base resin.

However, the coating composition described in the PTL 4 is excellent in storage stability, but corrosion resistance and processability of a coating film obtained from the coating composition are insufficient, and coating workability may be insufficient.

CITATION LIST

Patent Literature

PTL 1: JP-A-2005-120306
PTL 2: JP-A-2005-179491
PTL 3: JP-A-2016-113561
PTL 4: JP-T-2016-501291

SUMMARY OF INVENTION

Technical Problem

A problem to be solved by the present invention is to provide an aqueous coating composition that is excellent in corrosion resistance, processability, and coating workability and free from a raw material containing any legally regulated substance such as bisphenol A, and that is suitable to be used for a can.

Solution to Problem

As a result of a diligent study made to solve the foregoing problem, the present inventors have found out that the foregoing problem can be solved, thereby accomplishing the present invention, according to an aqueous coating composition including a polyolefin resin aqueous dispersion (A) containing polypropylene, a crosslinking agent (B) having a functional group that reacts with a carboxyl group, an amino silane (C), and an organic solvent (D) having water solubility and a boiling point in specific ranges.

That is, the present invention relates to the following contents.

1. An aqueous coating composition including a polyolefin resin aqueous dispersion (A) containing a polypropylene (A1), a crosslinking agent (B) having a functional group that reacts with a carboxyl group, an amino silane (C), and an organic solvent (D) having water solubility in a range of 0.01 to 5.0 g/100 g and a boiling point in a range of 120 to 250° C.
2. The aqueous coating composition according to the aforementioned item 1, in which a solid content of the polypropylene (A1) is not less than 40 mass % with respect to a total solid content of the polyolefin resin aqueous dispersion (A).
3. The aqueous coating composition according to the aforementioned item 1 or 2, in which a solid content of the crosslinking agent (B) is in a range of 0.1 to 20.0 mass %, a solid content of the amino silane (C) is in a range of 0.1 to 10.0 mass %, and a content of the organic solvent (D) is in a range of 0.1 to 10.0 mass % with respect to a total solid content of the polyolefin resin aqueous dispersion (A).
4. A coated metal can including a cured coating film made of the aqueous coating composition according to any one of the aforementioned items 1 to 3 is provided on at least a part of a body of the can.

Advantageous Effects of Invention

The aqueous coating composition according to the present invention contains the polypropylene contained in the polyolefin which is a base resin, and further contains the amino silane. Accordingly, the aqueous coating composition can obtain a coating film excellent in corrosion resistance and processability. In addition, the aqueous coating composition also contains the crosslinking agent having the functional group that reacts with the carboxyl group. Accordingly, the aqueous coating composition is excellent in curability, and the obtained coating film is also excellent in coating film performance such as water resistance.

Furthermore, the aqueous coating composition also contains the organic solvent having the water solubility and the boiling point in the specific ranges. Accordingly, the aqueous coating composition is also excellent in coating workability.

According to the present invention as described above, it is possible to provide an aqueous coating composition which can obtain a coating film excellent in corrosion resistance and processability particularly when used for a can, and which is also excellent in coating workability and free from a raw material containing any legally regulated substance such as bisphenol A.

DESCRIPTION OF EMBODIMENT

The present invention relates to an aqueous coating composition (which may be hereinafter also referred to as "the present coating" for short) including a polyolefin resin aqueous dispersion (A) containing a polypropylene (A1), a crosslinking agent (B) having a functional group that reacts with a carboxyl group, an amino silane (C), and an organic solvent (D) having water solubility in a range of 0.01 to 5.0 g/100 g and a boiling point in a range of 120 to 250° C.

An embodiment of the present invention will be described in detail below. Incidentally, in the description of the present invention, a ratio (such as a percentage or a part) based on "mass" is the same as a ratio (such as a percentage or a part) based on "weight".

<Aqueous Coating Composition>
[Polyolefin Resin Aqueous Dispersion (A)]

The polyolefin resin aqueous dispersion (A) in the aqueous coating composition according to the present embodiment is a dispersion liquid in which the polyolefin resin is present in a dispersed manner in a medium containing water as a main component.

The polyolefin resin is not particularly limited. Examples of the polyolefin resin include: homopolymers and copolymers (including elastomers) of one or more α-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as represented by polypropylene, polyethylene, poly-1-butene, poly-3-methyl-1-butene, poly-3-methyl-1-pentene, poly-4-methyl-1-pentene, ethylene-propylene copolymers, ethylene-1-butene copolymers, and propylene-1-butene copolymers; copolymers (including elastomers) of one α-olefin with conjugated or unconjugated dienes, as may be represented by ethylene-butadiene copolymers and ethylene-ethylidene norbornene copolymers; polyolefins (including elastomers) such as copolymers of two or more α-olefins with conjugated or unconjugated dienes, as may be represented by ethylene-propylene-butadiene copolymers, ethylene-propylene-dicyclopentadiene copolymers, ethylene-propylene-1,5-hexadien copolymers, and ethylene-propylene-ethylidene norbornene copolymers; and ethylene-vinyl compound copolymers such as ethylene-vinyl acetate copolymers, ethylene-vinyl alcohol copolymers, ethylene-vinyl chloride copolymers, ethylene-acrylic acid copolymers, ethylene-methacrylic acid copolymers, and ethylene-(meth)acrylate copolymers.

The polyolefin resin may have any of functional groups such as a hydroxyl group, an amino group, an aldehyde group, an epoxy group, an ethoxy group, a carboxyl group, an ester group, and an anhydride group, or may have two or more of these functional groups. It is preferable that the polyolefin resin particularly has the carboxyl group among the aforementioned functional groups.

Incidentally, in the description of the present invention, "(meth)acrylate" means "acrylate or methacrylate". In addition, "(meth)acrylamide" means "acrylamide or methacrylamide".

In the present coating, the polyolefin resin aqueous dispersion (A) contains a polypropylene (A1) as an essential component.

From the viewpoint of corrosion resistance, a solid content of the polypropylene (A1) is preferably not less than 40 mass %, more preferably not less than 50 mass %, with respect to a total solid content of the polyolefin resin aqueous dispersion (A).

In the present coating, the polyolefin resin aqueous dispersion (A) may contain another polyolefin resin (A2) than the polypropylene (A1), which is the essential component. The polyolefin resin (A2) preferably has a carboxy group.

As the polyolefin resin (A2), one kind may be used singly or two or more kinds may be used.

The polyolefin resin aqueous dispersion (A) may also contain a stabilizing agent from the viewpoint of stability such as acceleration of formation of the aqueous dispersion. Examples of the stabilizing agent include a surfactant, a polymer. The stabilizing agent may be used as one kind singly or may be used as two or more kinds in combination.

Examples of the surfactant include an anionic surfactant, a cationic surfactant, a nonionic surfactant.

Examples of the anionic surfactant include sulfonate, carboxylate, phosphate.

Examples of the cationic surfactant include quaternary amine salt.

Examples of the nonionic surfactant include a polymer containing a nonionic group such as polyoxyalkylene, a silicone surfactant.

A reactive surfactant having reactivity with the polyolefin resin may also be used as the surfactant.

Examples of the polymer include a polar polymer having a polar group.

Examples of the polar polymer include those based on resins such as an acrylic resin, a polyester resin, an epoxy resin, a polyamide resin, an acrylic modified polyester resin, and an acrylic modified epoxy resin.

A polyolefin resin having a polar group may also be used as the polar polymer. Examples of the functional group with polarity (the polar group) include a hydroxyl group, an amino group, an aldehyde group, an epoxy group, an ethoxy group, a carboxyl group, an ester group, an anhydride group.

In addition, for example, long-chain fatty acid having 12 to 60 carbon atoms, fatty acid salt, fatty acid alkyl ester, an ethylene-acrylic acid resin, etc. may also be used as the stabilizing agent.

When the stabilizing agent is used, a solid content of the stabilizing agent varies also depending on the kind of the stabilizing agent. However, from the viewpoint of storage stability, it is preferable that the solid content of the stabilizing agent is in a range of 5 to 35 mass %, particularly in a range of 10 to 30 mass %, with respect to a total solid content of the polyolefin resin.

The polyolefin resin aqueous dispersion (A) can be obtained by adding a basic compound as a neutralizing agent, if occasions demand, and then dispersing the basic compound in water.

Examples of the basic compound include hydroxide, carbonate, amine.

Examples of the hydroxide include ammonium hydroxide, potassium hydroxide, lithium hydroxide, sodium hydroxide.

Examples of the carbonate include sodium carbonate, sodium hydrogen carbonate, potassium carbonate, calcium carbonate.

Examples of the amine include monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n-propylamine, dimethyl-n-propylamine, N-methanolamine, N-aminoethylethanolamine, N-methyldiethanolamine, monoisopropanolamine, N,N-dimethylpropanolamine, 2-amino-2-methyl-1-propanol, tris(hydroxymethyl)-aminomethane, N,N,N',N'-Tetrakis(2-hydroxylpropyl)ethylenediamine, 1,2-diaminopropane, 2-amino-2-hydroxymethyl-1, 3-propanediol, N,N'-ethylenebis [bis(2-hydroxypropyl)amine]toluene-p-sulfonate. As the basic compound, the amine is preferred from the viewpoint of water resistance.

The polyolefin resin aqueous dispersion (A) can be produced by a publicly known method. Specifically, for example, the polyolefin resin aqueous dispersion (A) can be produced by adding, melting and kneading the polypropylene (A1), the polyolefin resin (A2) used if occasions demand, water, the stabilizing agent and the neutralizing agent (the basic compound) used if occasions demand, etc.

As a specific production procedure, for example, the aqueous dispersion can be produced as follows. That is, in the presence of water and one or more kinds of neutralizing agents, the polypropylene (A1), the polyolefin resin (A2) used if occasions demand, and one or more kinds of stabilizing agents used if occasions demand are melt and mixed, to thereby form an emulsion mixture. While removing heat from the emulsion mixture if occasions demand, the emulsion mixture is brought into contact with further diluted water to thereby form particles dispersed in the water. As a result, the aqueous dispersion is formed.

An average particle size of the solid component of the polyolefin resin aqueous dispersion (A) is preferably in a range of 100 nm to 1000 nm, particularly preferably in a range of 110 nm to 900 nm, more particularly preferably in a range of 120 nm to 800 nm from the viewpoint of coating workability.

The average particle size can be measured by a particle size analyzer, such as a coulter model N4MD (made by Beckman Coulter, Inc., trade name).

[Crosslinking Agent (B)]

The crosslinking agent (B) is a compound having a functional group that reacts with a carboxyl group. The crosslinking agent (B) usually has, in a molecule thereof, two or more functional groups that react with a carboxyl group.

Such a crosslinking agent (B) can enhance curability of the aqueous coating composition according to the present embodiment to thereby improve coating film performances such as corrosion resistance and water resistance of a coating film obtained from the aqueous coating composition, particularly the water resistance.

Examples of the functional group that reacts with the carboxyl group include a hydroxyalkylamide group, an oxazoline group, an aziridine group, an imide group (particularly a carbodiimide group), an epoxy group, a hydroxyl group, a methylol group.

Of the aforementioned functional groups, the hydroxyalkylamide group is preferred from the viewpoint of storage stability.

Examples of the crosslinking agent (B) include, specifically, a hydroxyalkylamide crosslinking agent, an oxazoline crosslinking agent, an aziridine crosslinking agent, an imide crosslinking agent (particularly a crosslinking agent having a carbodiimide group), an epoxy crosslinking agent.

Examples of the hydroxyalkylamide crosslinking agent include bis(N,N'-dihydroxyethyl) adipamide. Specifically, Switzerland EMS-GRILTECH's commercially available products PRIMIDs (trademark, trade names of crosslinking agent resins) such as PRIMID (trademark) XL-522 and PRIMID (trademark) SF-4510 can be enumerated.

Examples of the oxazoline crosslinking agent include a single component containing a vinyl monomer containing an oxazoline group such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, or a vinyl resin or an acrylic resin etc. in which the vinyl monomer containing the oxazoline group, and another monomer are copolymerized. As commercially available products, EPOCROS (registered trademark) WS-300, WS-500, WS-700, EPOCROS (registered trademark) K-2010, K-2020, K-2030, etc. made by Nippon Shokubai Co., Ltd. can be enumerated.

Examples of the aziridine crosslinking agent include glycerol-tris(1-aziridinyl propionate), glycerol-tris[2-methyl-(1-aziridinyl)]propionate, glycerol-tris[2-ethyl-(1-aziridinyl)]propionate, glycerol-tris[2-butyl-(1-aziridinyl)]propionate, glycerol-tris[2-propyl-(1-aziridinyl)]propionate, glycerol-tris[2-pentyl-(1-aziridinyl)]propionate, glycerol-tris[2-hexyl-(1-aziridinyl)]propionate, glycerol-tris [2,3-dimethyl-(1-aziridinyl)]propionate, glycerol-tris [2,3-diethyl-(1-aziridinyl)]propionate, glycerol-tris[2,3-dibutyl-(1-aziridinyl)]propionate), glycerol-tris[2,3-dipropyl-(1-aziridinyl)]propionate, glycerol-tris[2,3-dipenthyl-(1-aziridinyl)]propionate, glycerol-tris[2,3-dihexyl-(1-aziridinyl)]propionate, trimethylolpropane-tris(1-aziridinyl propionate), trimethylolpropane-tris[2-methyl-(1-aziridinyl)]propionate, trimethylolpropane-tris[2-ethyl-(1-aziridinyl)]propionate, trimethylolpropane-tris[2-butyl-(1-aziridinyl)]propionate), trimethylolpropane-tris[2-propyl-(1-aziridinyl)]propionate, trimethylolpropane-tris[2-pentyl-(1-aziridinyl)]propionate, trimethylolpropane-tris[2-hexyl-(1-aziridinyl)]propionate, trimethylolpropane-tris[2,3-dimethyl-(1-aziridinyl)]propionate, trimethylolpropane-tris [2,3-diethyl-(1-aziridinyl)]propionate, trimethylolpropane-tris[2,3-dibutyl-(1-aziridinyl)]propionate), trimethylolpropane-tris[2,3-dipropyl-(1-aziridinyl)]propionate, trimethylolpropane-tris[2,3-dipenthyl-(1-aziridinyl)]propionate, trimethylolpropane-tris[2,3-dihexyl-(1-aziridinyl)]propionate, tetramethylolmethane-tris(1-aziridinyl propionate), tetramethylolmethane-tris[2-methyl-(1-aziridinyl)]propionate, tetramethylolmethane-tris[2-ethyl-(1-aziridinyl)]propionate, tetramethylolmethane-tris[2-butyl-(1-aziridinyl)]propionate), tetramethylolmethane-tris[2-propyl-(1-aziridinyl)]propionate, tetramethylolmethane-tris [2-pentyl-(1-aziridinyl)]propionate, tetramethylolmethane-tris[2-hexyl-(1-aziridinyl)]propionate, tetramethylolmethane-tris[2,3-dimethyl-(1-aziridinyl)]propionate, tetramethylolmethane-tris [2,3-diethyl-(1-aziridinyl)]propionate, tetramethylolmethane-tris[2,3-dibutyl-(1-aziridinyl)]propionate), tetramethylolmethane-tris[2,3-dipropyl-(1-aziridinyl)]propionate, tetramethylolmethane-tris[2,3-dipentyl(1-aziridinyl)]propionate, tetramethylolmethane-tris [2,3-dihexyl-(1-aziridinyl)]propionate, pentaerythritol-tetra(1-aziridinyl propionate), pentaerythritol-tetra [2-methyl-(1-aziridinyl)]propionate, pentaerythritol-tetra [2-ethyl-(1-aziridinyl)]propionate, pentaerythritol-tetra [2-butyl-(1-aziridinyl)]propionate), pentaerythritol-tetra [2-propyl-(1-aziridinyl)]propionate, pentaerythritol-tetra [2-pentyl-(1-aziridinyl)]propionate, pentaerythritol-tetra [2-hexyl-(1-aziridinyl)]propionate, pentaerythritol-tetra [2,3-dimethyl-(1-aziridinyl)]propionate, pentaerythritol-tetra [2,3-diethyl-(1-aziridinyl)]propionate, pentaerythritol-tetra [2,3-dibutyl-(1-aziridinyl)]propionate), pentaerythritol-tetra [2,3-dipropyl-(1-aziridinyl)] propionate, pentaerythritol-tetra [2,3-dipentyl-(1-aziridinyl)]propionate, pentaerythritol-tetra [2,3-dihexyl-(1-aziridinyl)]propionate, tetraaziridinyl meta-xylenediamine, tetraaziridinyl methyl paraxylenediamine, tetramethylpropane tetraaziridinyl propionate, neopentyl glycol di(β-aziridinyl propionate), 4,4'-isopropylidenediphenol di(β-aziridinyl propionate), 4,4'-methylenediphenol di(β-aziridinyl propionate), 4,4'-bis(ethyleneiminocarbonylamino)diphenylmethane.

Examples of the imide crosslinking agent (particularly the crosslinking agent having the carbodiimide group) include 1,3-diisopropylcarbodiimide (i.e. N,N-diisopropylcarbodiimide), N,N-dicyclohexylcarbodiimide, N-ethyl-N'-(3-dimethylaminopropyl)-carbodiimide, or carbodiimide derivatives such as hydrochlorides derived from those carbodiimides.

As the crosslinking agent having the carbodiimide group, for example, CARBODILITEs (trade name, registered trademark) made by Nisshinbo Chemical Inc. can be used as commercially available products. Examples of the CARBODILITE include water-solution type "V-02", "V-02-L2", "SV-02", "V-04", "V-10", "SW-12G" (all of which are product names), and emulsion type "E-02", "E-03A", "E-05" (all of which are product names).

As the epoxy crosslinking agent, any publicly known epoxy resin (compound) having at least two epoxy groups (glycidyl groups) in a molecule can be used without any particular limitation, and in particular, an alicyclic epoxy compound can be used suitably.

As the alicyclic epoxy compound, commercially available products can be used. Specifically, DENACOLs (trade name, registered trademark) made by Nagase ChemteX Corp. can be enumerated.

Examples of the DENACOL include bifunctional type "EX-211", "EX-212", "EX-252", "EX-810", "EX-811", "EX-850", "EX-851", "EX-821", "EX-830", "EX-832", "EX-841", "EX-861", "EX-911", "EX-941", "EX-920", "EX-931" (all of which are product names), and multifunctional type "EX-313", "EX-314", "EX-321", "EX-411", "EX-421", "EX-512", "EX-521", "EX-612", "EX-614", "EX-614B" (all of which are product names).

Examples of the crosslinking agent having the hydroxyl group include bifunctional or higher, preferably trifunctional or higher polyhydric alcohols such as aliphatic alcohols such as glycerin, ethylene glycol pentaerythritol, pentaglycerol, and polyvinyl alcohol; alicyclic alcohols such as floroglucitol, quercitol, and inositol; aromatic alcohols such as tris(hydroxy)benzene; sugars such as starch, D-erythlose, L-arabinose, D-mannose, D-galactose, D-fructose, L-rhamnose, sucrose, maltose, and lactose; and sugar alcohols such as erythrite, L-arabite, adonit, and xylite.

The crosslinking agent (B) may be used as one kind singly or may be used as two or more kinds in combination.

A solid content of the crosslinking agent (B) varies also depending on the kind of the crosslinking agent. Particularly, from the viewpoint of improving corrosion resistance, the solid content of the crosslinking agent (B) is preferably in a range of 0.1 to 20.0 mass %, particularly preferably in a range of 0.2 to 18.0 mass %, more particularly preferably in a range of 0.3 to 16.0 mass %, with respect to the total solid content of the polyolefin resin aqueous dispersion (A). The solid content of the crosslinking agent (B) is preferably not less than 0.1 mass %, particularly preferably not less than 0.2 mass %, more particularly preferably not less than 0.3 mass %, with respect to the total solid content of the polyolefin resin aqueous dispersion (A). In addition, the solid content of the crosslinking agent (B) is preferably not more than 20.0 mass %, particularly preferably not more than 18.0 mass %, and more particularly preferably not more than 16.0 mass %, with respect to the total solid content of the polyolefin resin aqueous dispersion (A).

[Amino Silane (C)]

Due to the amino silane (C), corrosion resistance and processability of a coating film obtained from the aqueous coating composition according to the present embodiment can be improved.

The amino silane (C) is a silane compound having amino groups. Specifically, examples of the amino silane (C) include amino silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropyltriethoxysilane, γ-(2-aminoethyl)aminopropylmethyldimethoxysilane, N-phenyl-γ-aminopropyltrimethoxysilane, N-benzyl-γ-aminopropyltrimethoxysilane, and γ-ureidopropyltrimethoxysilane; bisalkoxysilyl type amines such as bis(trimethoxysilylpropyl)amine and bis(triethoxysilylpropyl)amine.

From the viewpoint of storage stability, γ-aminopropyltrimethoxysilane, γ-(2-aminoethyl)aminopropyltrimethoxysilane, γ-(2-aminoethyl)-3-aminopropylmethyldimethoxysilane can be suitably used as the amino silane (C).

The amino silane (C) preferably has a molecular weight of 100 to 1000. From the viewpoint of reactivity, the amino silane (C) particularly preferably has a molecular weight of 100 to 500.

A solid content of the amino silane (C) varies also depending on the kind of the amino silane. However, particularly from the viewpoint of improving corrosion resistance and processability, the solid content of the amino silane (C) is preferably in a range of 0.1 to 10.0 mass %, more preferably in a range of 0.2 to 6.0 mass %, with respect to the total solid content of the polyolefin resin aqueous dispersion (A). The solid content of the amino silane (C) is preferably not less than 0.1 mass %, more preferably not less than 0.2 mass %, with respect to the total solid content of the polyolefin resin aqueous dispersion (A). In addition, the solid content of the amino silane (C) is preferably not more than 10.0 mass %, more preferably not more than 6.0 mass %, with respect to the total solid content of the polyolefin resin aqueous dispersion (A).

[Organic Solvent (D)]

The organic solvent (D) is an organic solvent having water solubility in a range of 0.01 to 5.0 g/100 g and a boiling point in a range of 120 to 250° C.

Due to the organic solvent (D), defoamability of the aqueous coating composition according to the present embodiment is improved. Thus, coating workability can be improved.

From the viewpoint of the defoamability and the storage stability, the water solubility of the organic solvent (D) is in a range of 0.01 to 5.0 g/100 g, preferably in a range of 0.02 to 4.0 g/100 g, particularly preferably in a range of 0.03 to 2.0 g/100 g. The water solubility is not less than 0.01 g/100 g, preferably not less than 0.02 g/100 g, particularly preferably not less than 0.03 g/100 g. In addition, the water solubility is not more than 5.0 g/100 g, preferably not more than 4.0 g/100 g, particularly preferably not more than 2.0 g/100 g.

The water solubility is an index of a substance's affinity for water. The water solubility is a value expressed by the number of g (grams) that can be dissolved at maximum with respect to 100 g of water at 20° C.

From the viewpoint of the defoamability and the coating workability, the boiling point of the organic solvent (D) is in a range of 120 to 250° C., preferably in a range of 130 to 240° C., at 1 atm (760 mmHg). The boiling point of the organic solvent (D) is not lower than 120° C., preferably not lower than 130° C. In addition, the boiling point of the organic solvent (D) is not higher than 250° C., preferably not higher than 240° C.

As the organic solvent (D), n-hexanol (water solubility 0.6 g/100 g, boiling point 157° C.), 2-ethyl-1-hexanol (water solubility 0.1 g/100 g, boiling point 195° C.), 2-hexyloxyethanol (water solubility 1.0 g/100 g, boiling point 208° C.), butyl acetate (water solubility 0.7 g/100 g, boiling point 126° C.), butyl propionate (water solubility 0.2 g/100 g, boiling point 145° C.), ethylene glycol monobutyl ether acetate (water solubility 1.1 g/100 g, boiling point 191° C.), isophorone (water solubility 1.2 g/100 g, boiling point 215° C.), ethylene glycol mono-2-ethylhexyl ether (water solubility 0.2 g/100 g, boiling point 229° C.), dipropylene glycol n-butyl ether (water solubility 4.0 g/100 g, boiling point 230° C.), propylene glycol monophenyl ether (water solubility 2.0 g/100 g, boiling point 243° C.), etc. can be specifically enumerated.

A content of the organic solvent (D) varies also depending on the kind of the organic solvent (D), Particularly from the viewpoint of improving the defoamability, the content of the organic solvent (D) is preferably in a range of 0.1 to 10.0 mass %, more preferably in a range of 0.2 to 6.0 mass %, with respect to the total solid content of the polyolefin resin aqueous dispersion (A). The content of the organic solvent (D) is preferably not less than 0.1 mass %, more preferably not less than 0.2 mass %, with respect to the total solid content of the polyolefin resin aqueous dispersion (A). In addition, the content of the organic solvent (D) is preferably not more than 10 mass %, more preferably not more than 6.0 mass %, with respect to the total solid content of the polyolefin resin aqueous dispersion (A).

The aqueous coating composition according to the present embodiment contains a medium in which water is used as a main component. From the viewpoint of the coating workability and the storage stability, a solid content concentration of the aqueous coating composition according to the present embodiment is preferably in a range of 10 to 50 mass %, and particularly preferably in a range of 15 to 40 mass %.

Further, if occasions demand, conventionally publicly known raw materials such as another organic solvent than the organic solvent (D), a defoaming agent, another silane compound than the amino silane, a surfactant, a lubricant, wax, a viscosity modifier, and a pigment can be appropriately mixed to be used as the aqueous coating composition according to the present embodiment.

Examples of the other organic solvent than the aforementioned organic solvent (D) that can be used in the present embodiment include methanol, ethanol, n-propanol, isopropanol, n-butanol, sec-butanol, tert-butanol, isobutanol, amyl alcohol, octanol, and alkyl alcohols; glycol ethers such as methyl cellosolve, ethyl cellosolve, propyl cellosolve, butyl cellosolve, methylcarbitol, ethylcarbitol, and butylcarbitol; or glycol ether esters etc. such as methylcellosolve acetate, and ethylcellosolve acetate; dioxane; dimethylformamide; tetrahydrofuran; methyl ethyl ketone; methyl isobutyl ketone; diacetone alcohol. Two or more kinds of these examples may be used in combination.

Examples of the aforementioned defoaming agent include compounds such as an acrylic compound, a vinylether compound and a dimethylpolysiloxane compound. Two or more of these examples may be used in combination.

Examples of the other silane compound than the aforementioned amino silane include a silane coupling agent having a vinyl group, a methacrylic group, an acryloxy group, a methacryloxy group as an organic functional group. Two or more of these examples may be used in combination.

The aqueous coating composition according to the present embodiment can be applied to any of various base materials. As the base materials, an untreated or surface-treated metal sheet such as an aluminum sheet, a steel sheet or a tin sheet, a metal plate etc. in which the metal sheet is coated with an epoxy, vinyl, or another primer, and a can etc. into which the metal sheet or the metal plate is processed, etc. can be enumerated.

Examples of the can with which the aqueous coating composition according to the present embodiment can be coated include cans having various forms such as a two-piece can consisting of two parts (i.e. a lid part and a body part that has been integrated with a bottom part), a three-piece can consisting of three parts (i.e. a lid part, a bottom part, and a body part), and a bottle can. Each part of each of the aforementioned cans can be coated with the aqueous coating composition according to the present invention.

Since a coating film obtained from the aqueous coating composition according to the present embodiment is excellent in corrosion resistance and processability, the coating film can be suitably used for a can such as a beverage can, especially for coating of an inner surface of the can.

Moreover, the aqueous coating composition according to the present embodiment can be also used for repair coating of a seam portion (joint portion) in the inner surface of the can, or coating of an outer surface of the can such as an outer surface of a can lid or a tab.

Any of various publicly known methods such as spray coating, roll coater coating, dip coating, and electrodeposition coating can be applied as a method for coating the base material with the aqueous coating composition according to the present embodiment. Of them, the spray coating or the roll coater coating is particularly preferred.

An amount of the coating may be appropriately selected according to its use. However, the amount of the coating is, for example, preferably about 1 μm to 30 μm, particularly preferably about 2 μm to 20 μm, in terms of the thickness of the dry coating film. A drying condition for the coating film is, for example, preferably in a range of 10 seconds to 30 minutes under a condition that the maximum temperature that can be reached by the material is 120 to 300° C., particularly preferably in a range of 15 seconds to 10 minutes at 200 to 280° C.

<Coated Metal Can>

A coated metal can according to the present embodiment has a cured coating film that is made of the aforementioned aqueous coating composition and that is provided on at least a part of a body of the can.

An aqueous coating composition used for the aforementioned coated metal can is the same as the aqueous coating composition in the aforementioned <Aqueous Coating Composition>, and its preferred form is also the same. Moreover, a coating method etc. of the aqueous coating composition in the aforementioned coated metal can is also not limited particularly, but the coating method, etc. of the aqueous coating composition in the aforementioned <Aqueous Coating Composition> can be appropriately used. As the aforementioned can, any of cans having various forms can be suitably used, similarly to those enumerated in the aforementioned <Aqueous Coating Composition>, and the cured coating film made of the aforementioned aqueous coating composition is provided on at least a part of the body of the can.

EXAMPLES

The present invention will be described below more specifically based on Examples. Herein, "part" and "%" mean "mass part" and "mass %" respectively. Incidentally, each of mass parts of raw materials in the following Production Examples, Examples, and Comparative Examples represents a mass part of a solid content (or may be referred to as an active ingredient) of the raw material.

Production Example 1: Production of Polyolefin Resin Aqueous Dispersion (A-1)

Polypropylene (6D43 (trade name), produced by Braskem America, Inc.) added at 60 g/min, PRIMACOR 5980i (trade name, ethylene-acrylic acid copolymer, produced by Dow Inc.) added as a polyolefin resin (A2) at 180 g/min, and LICOCENE 6452 (trade name, propylene-maleic anhydride graft copolymer, produced by Clariant AG) added at 60 g/min were fed to a twin-screw extruder heated to 160° C. Deionized water and dimethylethanolamine were fed to the extruder at 70 g/min and 30 g/min, respectively, and dilution water was fed to two places in a dilution compartment of the extruder so that a final solid content was 47%. As to a temperature profile of the extruder, the temperature was reduced to be lower than 100° C. before termination of the extruder. Extrusion with adjusted back pressure was performed at 1200 rpm to obtain a polyolefin resin aqueous dispersion (A-1) with the solid content of 47 mass %.

Incidentally, a solid content of the polypropylene (A1) is 20 mass % with respect to the total solid content of the polyolefin resin aqueous dispersion (A-1).

Production Example 2: Production of Polyolefin Resin Aqueous Dispersion (A-2)

Polypropylene (6D43 (trade name), produced by Braskem America, Inc.) added at 150 g/min, PRIMACOR 5980i added as a polyolefin resin (A2) at 108 g/min, and LICOCENE 6452 added at 45 g/min were fed to a twin-screw extruder heated to 160° C. Deionized water and dimethylethanolamine were fed to the extruder at 70 g/min and 30 g/min, respectively, and dilution water was fed to two places in a dilution compartment of the extruder so that a final solid content was 47%. As to a temperature profile of the extruder, the temperature was reduced to be lower than 100° C. before termination of the extruder. Extrusion with adjusted back pressure was performed at 1200 rpm to obtain a polyolefin resin aqueous dispersion (A-2) with the solid content of 47 mass %.

Incidentally, a solid content of the polypropylene (A1) is 49.5 mass % with respect to the total solid content of the polyolefin resin aqueous dispersion (A-2).

Production Example 3: Production of Polyolefin Resin Aqueous Dispersion (A-3)

Polypropylene (6D43 (trade name), produced by Braskem America, Inc.) added at 212 g/min, PRIMACOR 5980i (trade name, ethylene-acrylic acid copolymer, produced by Dow Inc.) added as a polyolefin resin (A2) at 68 g/min, and LICOCENE 6452 (trade name, propylene-maleic anhydride graft copolymer, produced by Clariant AG) added at 23 g/min were fed to a twin-screw extruder heated to 160° C. Deionized water and dimethylethanolamine were fed to the extruder at 70 g/min and 30 g/min, respectively, and dilution water was fed to two places in a dilution compartment of the extruder so that a final solid content was 47%. As to a temperature profile of the extruder, the temperature was reduced to be lower than 100° C. before termination of the extruder. Extrusion with adjusted back pressure was performed at 1200 rpm to obtain a polyolefin resin aqueous dispersion (A-3) with the solid content of 47 mass %.

Incidentally, a solid content of the polypropylene is 70 mass % with respect to the total solid content of the polyolefin resin aqueous dispersion (A-3).

Example 1: Production of Aqueous Coating Composition No. 1

An aqueous coating composition No. 1 with a mass solid content concentration of 20% was obtained as follows. That is, the raw materials shown in Table 1 were mixed at the composition ratios (mass solid content ratios, except for the organic solvent (D) expressed by an actual compounded amount) shown in Table 1, ethylene glycol monobutyl ether was added thereto while being diluted with deionized water so as to reach 7 mass % with respect to a total amount of the aqueous coating composition with the mass solid content concentration of 20% after adjustment of the dilution, and dimethylethanolamine was then added to adjust pH of the mixture to 8.0.

The value of the amount of each of the raw materials in Tables 1 and 2 represents a mass ratio of a solid content (or may be referred to as an active ingredient) of each of the raw materials. However, the value of the amount of the organic solvent (D) represents a mass ratio of the actual compounded amount.

Incidentally, in each of the tables, "KBM-1003" shown in the row of amino silane (C) is a component used for comparison of the amino silane (C). Moreover, "toluene", "di(ethylene glycol) 2-ethylhexyl ether", "normal decane", "dipropylene glycol methyl ether acetate", and "diethylene glycol monoethyl ether" shown in the rows of the organic solvent (D) are components used for comparison of the organic solvent (D).

In addition, Remarks 1 through 16 in the Tables 1 and 2 are as follows.
  (Remark 1) PRIMID XL-522: hydroxyalkylamide crosslinking agent, produced by EMS-GRILTECH
  (Remark 2) EPOCROS WS-700: oxazoline crosslinking agent, oxazoline group-containing polymer, produced by Nippon Shokubai Co., Ltd.
  (Remark 3) CARBODILITE E-02: imide crosslinking agent, carbodiimide resin, produced by Nisshinbo Chemical Inc.
  (Remark 4) KBM-903: γ-aminopropyltrimethoxysilane, produced by Shin-Etsu Chemical Co., Ltd.
  (Remark 5) KBM-602: N-β(aminoethyl) γ-aminopropyl methyl dimethoxysilane, produced by Shin-Etsu Chemical Co., Ltd.

(Remark 6) KBM-1003: vinyl trimethoxysilane, produced by Shin-Etsu Chemical Co., Ltd.
(Remark 7) n-hexanol (water solubility 0.6 g/100 g, boiling point 157° C.)
(Remark 8) butyl acetate (water solubility 0.7 g/100 g, boiling point 126° C.)
(Remark 9) 2-ethyl-1-hexanol (water solubility 0.1 g/100 g, boiling point 195° C.)
(Remark 10) ethylene glycol mono-2-ethylhexyl ether (water solubility 0.2 g/100 g, boiling point 229° C.)
(Remark 11) propylene glycol monophenyl ether (water solubility 2.0 g/100 g, boiling point 243° C.)
(Remark 12) toluene (boiling point 111° C.)
(Remark 13) di(ethylene glycol) 2-ethylhexyl ether (boiling point 272° C.)
(Remark 14) normal decane (water solubility 0 g/100 g)
(Remark 15) dipropylene glycol methyl ether acetate (water solubility 19.0 g/100 g)
(Remark 16) diethylene glycol monoethyl ether (water solubility ∞)

Examples 2 to 18 and Comparative Examples 1 to 9: Production of Aqueous Coating Composition Nos. 2 to 27

Each of aqueous coating composition Nos. 2 to 27 was produced in the same manner as in the aforementioned Example 1. The aqueous coating composition Nos. 19 to 27 are used as Comparative Examples.

<Production of Test Coated Plates>

The aqueous coating compositions obtained respectively in the aforementioned Examples and Comparative Examples were applied to 0.26 mm-thick #5052 aluminum (aluminum alloy whose alloy number was 5052 as specified in JIS H4000:2014) plates respectively by a bar coater and heated for 1 minute at 200° C. so that each of cured coating films was 5 μm in terms of film thickness. In this manner, each of test coated plates was obtained.

Each of tests was performed on each of the obtained test coated plates according to the following test method. Test results are shown in the Tables 1 and 2.

[T-Bend Folding Processability]

Each of the test coated plates was cut 5 cm in a rolling direction and 4 cm in a vertical direction, and then folded in two with its lower part parallel to the short side. Two 0.26 mm-thick aluminum plates were sandwiched between the two folded portions of a test piece of the test coated plate in a room at 20° C., and set in a special seam folding type DuPont impact tester. After a 1 kg iron weight with a flat contact surface was dropped from a height of 50 cm to give impact to the folded portions, a voltage of 6.5 V was applied between tip portions of the folded portions for 6 seconds, and a current value (mA) at a 20 mm width from the tip portions of the folded portions was measured and evaluated according to the following criteria.

I: The current value was lower than 10 mA.
II: The current value was not lower than 10 mA and lower than 40 mA.
III: The current value was not lower than 40 mA and lower than 80 mA.
IV: The current value was not lower than 80 mA.

Adhesion of the coating film in the processed portion was evaluated using Cellulose Tape (registered trademark) made by Nichiban Co., Ltd., and evaluated according to the following criteria.

I: A peeled area of the coating film was less than 10%.
II: The peeled area of the coating film was not less than 10% and less than 20%.
III: The peeled area of the coating film was not less than 20% and less than 40%.
IV: The peeled area of the coating film was not less than 40%.

[Retort Resistance]

After the test coated plates were immersed in water and treated at 125° C. for 30 minutes, each of whitening states of the coating films was visually observed and evaluated according to the following criteria.

I: No whitening was observed at all.
II: Partial whitening was slightly observed.
III: Whitening was considerably observed.
IV: Whitening was significantly observed.

[Corrosion Resistance]

The test coated plates were immersed in a mixed aqueous solution in which each of citric acid and sodium chloride was dissolved at 3%, and stored at 40° C. for 2 weeks. Then, coated surface conditions of the test coated plates were visually observed and evaluated according to the following criteria. Each of the test coated plates was tested using each of the following test aqueous solutions 1 and 2, and evaluated according to the following criteria.

I: Neither gloss nor corrosion was observed.
II: There was gloss, but no corrosion was observed.
III: Corrosion was slightly observed.
IV: Corrosion was considerably observed.

Test Aqueous Solution 1: Aqueous solution in which each of citric acid and sodium chloride was dissolved to have a concentration of 3 mass %.

Test Aqueous Solution 2: Aqueous solution in which each of citric acid and sodium chloride was dissolved to have a concentration of 3 mass %, and further, ethanol was dissolved to have a concentration of 7 mass %.

[Coating Workability]

The coating was applied to an inner surface of a 2-piece can by airless spraying and cured in a conveyor oven under a condition where the temperature of the can was maintained at 200° C. for 1 minute.

The obtained can whose inner surface had been coated was cut open with metal cutting scissors, and a state in which the coating was dropping on the bottom of the can and a state in which the coating was boiling there were evaluated according to the following criteria I: Dropping was little and no boiling was observed.
II: Dropping and boiling were slightly observed.
III: Dropping and boiling were considerably observed.
IV: Dropping and boiling were significant.

[Coating Stability]

Each of the aqueous coating compositions was left still at room temperature for one week and visually evaluated according to the following criteria.

I: No precipitation was observed.
II: Precipitation was hardly observed.
III: Precipitation was slightly observed.
IV: A considerable amount of precipitation was observed.

TABLE 1

| | | Example | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| Aqueous Coating Composition No. | | 1 | 2 | 3 | 4 | 5 | 6 | 7 | 8 | 9 | 10 | 11 | 12 | 13 | 14 | 15 | 16 | 17 | 18 |
| Solid Content of Polyolefin Resin Aqueous Dispersion (A-1) | | 100 | | | | | | | | | | | | | | | | | |
| Solid Content of Polyolefin Resin Aqueous Dispersion (A-2) | | | 100 | | | | | | | | | | | | | | | | |
| Solid Content of Polyolefin Resin Aqueous Dispersion (A-3) | | | | 100 | 100 | 100 | 100 | 100 | 100 | 100 | 100 | 100 | 100 | 100 | 100 | 100 | 100 | 100 | 100 |
| Solid Content of Crosslinking Agent (B) | PRIMID XL-522 (Remark 1) | 5 | 5 | 5 | 1 | 8 | 15 | 18 | 5 | 5 | 5 | | | 5 | 5 | 5 | 5 | 5 | 5 |
| | EPOCROS WS-700 (Remark 2) | | | | | | | | | | | 5 | | | | | | | |
| | CARBODILITE E-02 (Remark 3) | | | | | | | | | | | | 5 | | | | | | |
| Solid Content of Amino Silane (C) | KMB-903 (Remark 4) | 1 | 1 | 1 | 1 | 1 | 1 | 1 | 5 | 8 | | 1 | 1 | 1 | 1 | 1 | 1 | 1 | 1 |
| | KBM-602 (Remark 5) | | | | | | | | | | 1 | | | | | | | | |
| | KBM-1003 (Remark 6) | | | | | | | | | | | | | | | | | | |
| Actual Compounded Amount of Organic Solvent (D) | n-hexanol (Remark 7) | 1 | 1 | 1 | 1 | 1 | 1 | 1 | 1 | 1 | 1 | 1 | 1 | 5 | 8 | | | | |
| | butyl acetate (Remark 8) | | | | | | | | | | | | | | | 1 | | | |
| | 2-ethyl-1-hexanol (Remark 9) | | | | | | | | | | | | | | | | 1 | | |
| | ethylene glycol mono-2-ethylhexyl ether (Remark 10) | | | | | | | | | | | | | | | | | 1 | |
| | propylene glycol monophenyl ether (Remark 11) | | | | | | | | | | | | | | | | | | 1 |
| | toluene (Remark 12) | | | | | | | | | | | | | | | | | | |
| | di(ethylene glycol) 2-ethylhexyl ether (Remark 13) | | | | | | | | | | | | | | | | | | |
| | normal decane (Remark 14) | | | | | | | | | | | | | | | | | | |
| | dipropylene glycol methyl ether acetate (Remark 15) | | | | | | | | | | | | | | | | | | |
| | diethylene glycol monoethyl ether (Remark 16) | | | | | | | | | | | | | | | | | | |
| Performance Test | T-Bend Folding Processability Current Value | II | I | I | I | I | I | I | I | I | I | I | I | I | I | I | I | I | I |
| | T-Bend Folding Processability Adhesion | II | I | I | I | I | I | II | I | II | I | I | I | I | I | I | I | I | I |
| | Retort Resistance | II | I | I | I | I | I | II | I | II | I | II | II | I | I | I | I | I | I |
| | Corrosion Resistance: Test Aqueous Solution 1 | II | I | I | I | I | I | I | I | I | I | I | I | I | I | I | I | I | I |
| | Corrosion Resistance: Test Aqueous Solution 2 | II | I | I | I | I | I | II | I | II | I | II | II | I | I | I | I | I | I |
| | Coating Workability | I | I | I | I | I | I | I | I | I | I | I | I | I | II | I | I | I | I |
| | Coating Stability | I | I | I | I | I | I | I | I | II | I | II | II | I | I | I | I | I | I |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Aqueous Coating Composition No. | | 19 | 20 | 21 | 22 | 23 | 24 | 25 | 26 | 27 |
| Solid Content of Polyolefin Resin Aqueous Dispersion (A-1) | | | | | | | | | | |
| Solid Content of Polyolefin Resin Aqueous Dispersion (A-2) | | | | | | | | | | |
| Solid Content of Polyolefin Resin Aqueous Dispersion (A-3) | | 100 | 100 | 100 | 100 | 100 | 100 | 100 | 100 | 100 |
| Solid Content of Crosslinking Agent (B) | PRIMID XL-522 (Remark 1) | | 5 | 5 | 5 | 5 | 5 | 5 | 5 | 5 |
| | EPOCROS WS-700 (Remark 2) | | | | | | | | | |
| | CARBODILITE E-02 (Remark 3) | | | | | | | | | |
| Solid Content of Amino Silane (C) | KMB-903 (Remark 4) | 1 | | | 1 | 1 | 1 | 1 | 1 | 1 |
| | KBM-602 (Remark 5) | | | | | | | | | |
| | KBM-1003 (Remark 6) | | | 1 | | | | | | |
| Actual Compounded Amount of Organic Solvent (D) | n-hexanol (Remark 7) | 1 | 1 | 1 | | | | | | |
| | butyl acetate (Remark 8) | | | | | | | | | |
| | 2-ethyl-1-hexanol (Remark 9) | | | | | | | | | |
| | ethylene glycol mono-2-ethylhexyl ether (Remark 10) | | | | | | | | | |
| | propylene glycol monophenyl ether (Remark 11) | | | | | | | | | |
| | toluene (Remark 12) | | | | 1 | | | | | |
| | di(ethylene glycol) 2-ethylhexyl ether (Remark 13) | | | | | 1 | | | | |
| | normal decane (Remark 14) | | | | | | 1 | | | |
| | dipropylene glycol methyl ether acetate (Remark 15) | | | | | | | 1 | | |
| | diethylene glycol monoethyl ether (Remark 16) | | | | | | | | 1 | |

TABLE 2-continued

| | | Comparative Example | | | | | | | | |
|---|---|---|---|---|---|---|---|---|---|---|
| | | 1 | 2 | 3 | 4 | 5 | 6 | 7 | 8 | 9 |
| Performance Test | T-Bend Folding Processability Current Value | I | I | I | I | I | I | I | I | I |
| | T-Bend Folding Processability Adhesion | II | III | III | I | I | I | I | I | I |
| | Retort Resistance | III | II | II | I | I | I | I | I | I |
| | Corrosion Resistance: Test Aqueous Solution 1 | II | II | II | I | I | I | I | I | I |
| | Corrosion Resistance: Test Aqueous Solution 2 | III | III | III | I | I | I | I | I | I |
| | Coating Workability | I | I | I | III | III | III | III | III | III |
| | Coating Stability | I | I | III | I | I | I | I | I | I |

Although the present invention has been described in detail and with reference to specific embodiments, it is obvious to those skilled in the art that various changes or modifications can be made without departing from the spirit and scope of the present invention. The present application is based on a Japanese patent application (Patent Application No. 2020-099469) filed on Jun. 8, 2020, the contents of which are incorporated herein by reference.

INDUSTRIAL APPLICABILITY

It is possible to provide a coated can that is excellent in corrosion resistance and processability, and it is possible to provide an aqueous coating composition that is also excellent in coating workability and free from any legally regulated substance such as bisphenol A.

The invention claimed is:

1. An aqueous coating composition comprising a polyolefin resin aqueous dispersion (A) containing a polypropylene (A1), a crosslinking agent (B) having a functional group that reacts with a carboxyl group, an amino silane (C), and an organic solvent (D) having water solubility in a range of 0.01 to 5.0 g/100 g and a boiling point in a range of 120 to 250° C.,
  wherein a content of the organic solvent (D) is in a range of 0.2 to 6.0 mass % with respect to a total solid content of the polyolefin resin aqueous dispersion (A).

2. The aqueous coating composition according to claim 1, wherein a solid content of the polypropylene (A1) is not less than 40 mass % with respect to a total solid content of the polyolefin resin aqueous dispersion (A).

3. The aqueous coating composition according to claim 1, wherein a solid content of the crosslinking agent (B) is in a range of 0.1 to 20.0 mass %, and a solid content of the amino silane (C) is in a range of 0.1 to 10.0 mass % with respect to a total solid content of the polyolefin resin aqueous dispersion (A).

4. A coated metal can comprising a cured coating film made of the aqueous coating composition according to claim 1 on at least a part of a body of the can.

5. The aqueous coating composition according to claim 2, wherein a solid content of the crosslinking agent (B) is in a range of 0.1 to 20.0 mass %, and a solid content of the amino silane (C) is in a range of 0.1 to 10.0 mass % with respect to a total solid content of the polyolefin resin aqueous dispersion (A).

6. A coated metal can comprising a cured coating film made of the aqueous coating composition according to claim 2 on at least a part of a body of the can.

7. A coated metal can comprising a cured coating film made of the aqueous coating composition according to claim 3 on at least a part of a body of the can.

8. A coated metal can comprising a cured coating film made of the aqueous coating composition according to claim 5 on at least a part of a body of the can.

* * * * *